(12) United States Patent
Johnson et al.

(10) Patent No.: US 6,704,127 B1
(45) Date of Patent: Mar. 9, 2004

(54) IMAGING DEVICE AND METHOD FOR IMAGING PHOTOSENSITIVE MEDIA OF DIFFERENT FORMATS

(75) Inventors: Clayton G. Johnson, Spencerport, NY (US); John E. Mooney, Rochester, NY (US); Joel D. Decaro, Brockport, NY (US); David J. Nelson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 553 days.

(21) Appl. No.: 09/602,167

(22) Filed: Jun. 22, 2000

(51) Int. Cl.[7] .................. G03B 27/62; G03B 27/06; H04N 1/46
(52) U.S. Cl. .................. 358/487; 358/506; 355/75; 355/76; 355/96
(58) Field of Search .................. 358/487, 506, 358/475, 509, 496; 399/76, 85, 361, 367; 355/72, 74, 55, 96, 75, 56, 27, 28

(56) References Cited

U.S. PATENT DOCUMENTS

| | | |
|---|---|---|
| 3,749,482 A | 7/1973 | Greenwood .................. 352/80 |
| 4,858,003 A | 8/1989 | Wirt et al. .................. 358/102 |
| 5,130,746 A | 7/1992 | Hicks .................. 355/71 |
| 5,710,642 A | 1/1998 | Kiesow .................. 358/474 |
| 5,835,202 A | 11/1998 | Kanis .................. 355/75 |
| 6,088,084 A | * 7/2000 | Nishio .................. 355/75 |
| 6,333,778 B1 | * 12/2001 | Katakura et al. .................. 355/56 |

* cited by examiner

*Primary Examiner*—Edward Coles
*Assistant Examiner*—Jason Sherrill
(74) *Attorney, Agent, or Firm*—David A. Novais

(57) ABSTRACT

The present invention provides for an imaging device such as a scanner or printer. The imaging device includes a unique media gate arrangement in which each of the media gates is positioned along the same optical axis. This provides for a gate arrangement in which media of a first format will be conveyed across one of the gates and media of a second format will be conveyed across a second one of the gates. With the arrangement of the present invention it is not necessary to change a media gate based on the format of the film or media used, since the media gates based are positioned along the same optical axis and are positioned such that the light beam passes through both gates.

37 Claims, 10 Drawing Sheets

IMAGING DEVICE AND METHOD FOR IMAGING PHOTOSENSITIVE MEDIA OF DIFFERENT FORMATS

FIELD OF THE INVENTION

The present invention relates to an imaging device and method utilized in imaging applications, such as scanning and printing, which comprises a unique media gate arrangement. The device and method of the present invention enables, for example, a scanning of photosensitive media of different formats without requiring the movement of media gates, by positioning the media gates along the same optical axis.

BACKGROUND OF THE INVENTION

Current film gate designs utilized in printing and scanning applications require the manual or automatic changing of the film gates for respective films of different format. For example, a unique film gate is required for 35 mm film, and when subsequently scanning APS (Advanced PhotoSystem) film, the 35 mm film gate has to be either manually or automatically changed for an APS film gate. Thus, a different or dedicated film gate, depending on the film type is required for printing or scanning. In retail mini labs, this changeover is done by a human operator, while in a high volume wholesale application, the film must be sensed and a complicated automatic exchange of film gates is required. This is especially problematic in high volume operations since it increases time and or may require increased training of operators.

SUMMARY OF THE INVENTION

An object of the present invention is to provide for an imaging device having a unique media gate arrangement, which requires no operator intervention or complicated movement of the media gates to accommodate different media types.

The present invention relates to an imaging device that is adapted to image, for example, scan photosensitive media of different formats. The imaging device comprises a first media gate for a first photosensitive media of a first format, with the first media gate being located at an optical axis and having a first aperture through which a light beam can pass; and a second media gate for a second photosensitive media of a second format, with the second media gate being located at the optical axis and having a second aperture through which the light beam can pass.

The present invention further relates to a method of imaging photosensitive media of different formats. The method comprises the steps of positioning a first media gate at an optical axis; positioning a second media gate at the optical axis and downstream of the first media gate with respect to a direction of a beam of light along the optical axis; and conveying a first photosensitive media of a first format across the first media gate and a second photosensitive media of a second format across the second media gate.

The present invention further relates to a scanner for scanning photosensitive film of different formats. The scanner comprises an illumination source for directing a beam of light along an optical axis; a first film gate for film of a first format, with the first film gate having a first aperture of a first size and being located at the optical axis; and a second film gate for film of a second format, with the second film gate having a second aperture of a second size which is smaller than the first size. The second film gate is located at the optical axis downstream of the first film gate with respect to a direction of the light beam. A length of the first aperture permits a path of the light beam between the first film gate and the second film gate due to converge as it approaches the second film gate, such that the light beam is substantially within the second aperture of the second film gate when the light beam reaches the second film gate.

The present invention further relates to an imaging device comprising a plurality of media gates. Each of the media gates is adapted to image media of a different format. Also, each of the media gates is located along a single optical axis such that a light beam can pass along the optical axis through the media gates.

The present invention further provides for a unique blocking arrangement which accommodates the different media gates in relation to the light beam, as well as a transport mechanism for transporting media to the different gates.

An advantage of an imaging device having the film gate arrangement at the present invention is that an exchange of film gates for different format films is not required. This eliminates or reduces human interaction and saves time and training. Further, precision in positioning of film gates is not required, which leads to a savings in cost and maintenance. Also, the present invention allows the film gate to be a permanent part of the imaging device.

Also, with the arrangement of the present invention, an operator is not required to batch film types or plan ahead for a changeover of film gates. Further, conjugate movements, such as a distance from a lens to a film plane and a distance from a film plane to a CCD (or paper in the case of printing), can be accommodated by the system and method of the present invention. This reduces the amount of travel time and distance by the components of the lens and CCD (or paper in the case of printing).

Also, the system and method of the present invention is applicable to 35 mm film, APS film, 120 mm, 46 mm, 110 and other combinations of films and media.

DETAILED DESCRIPTION OF THE INVENTION

Figure 1A:
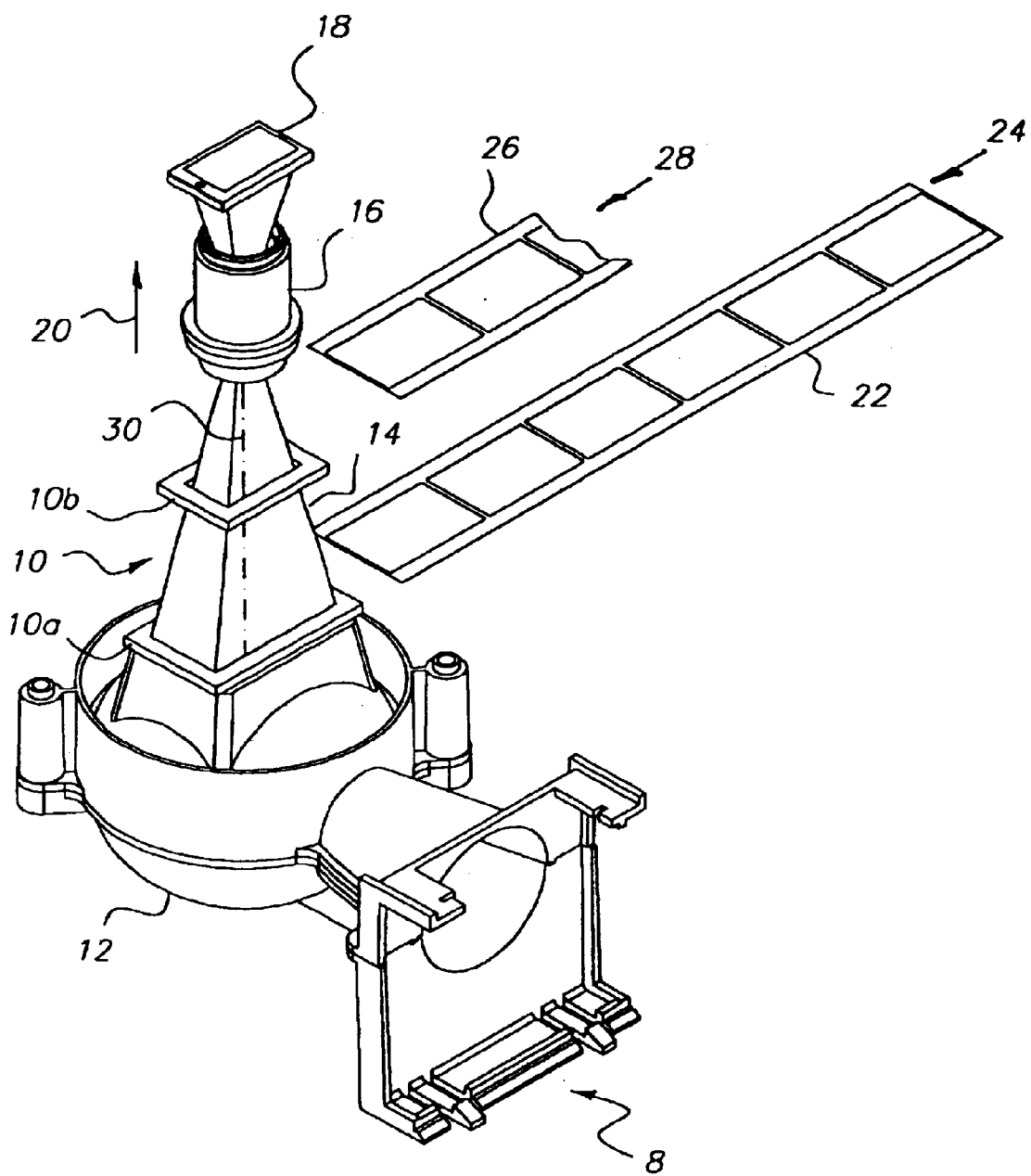
FIG. 1(a) illustrates a perspective view of an imaging device, such as a scanner, having a media gate arrangement in accordance with the present invention.

Referring now to drawings, wherein like reference numerals represent identical or corresponding parts throughout the several views, FIG. 1(a) illustrates an imaging device 8 such as a scanner, having a unique media gate arrangement 10 in accordance with the present invention. Although a scanner is illustrated in FIG. 1(a) it is recognized that the present invention is not limited thereto. Imaging device 8 could be, for example, a printer which prints onto paper 1000 using media gate arrangement 10 as shown in FIG. 1(b).

Figure 1B:
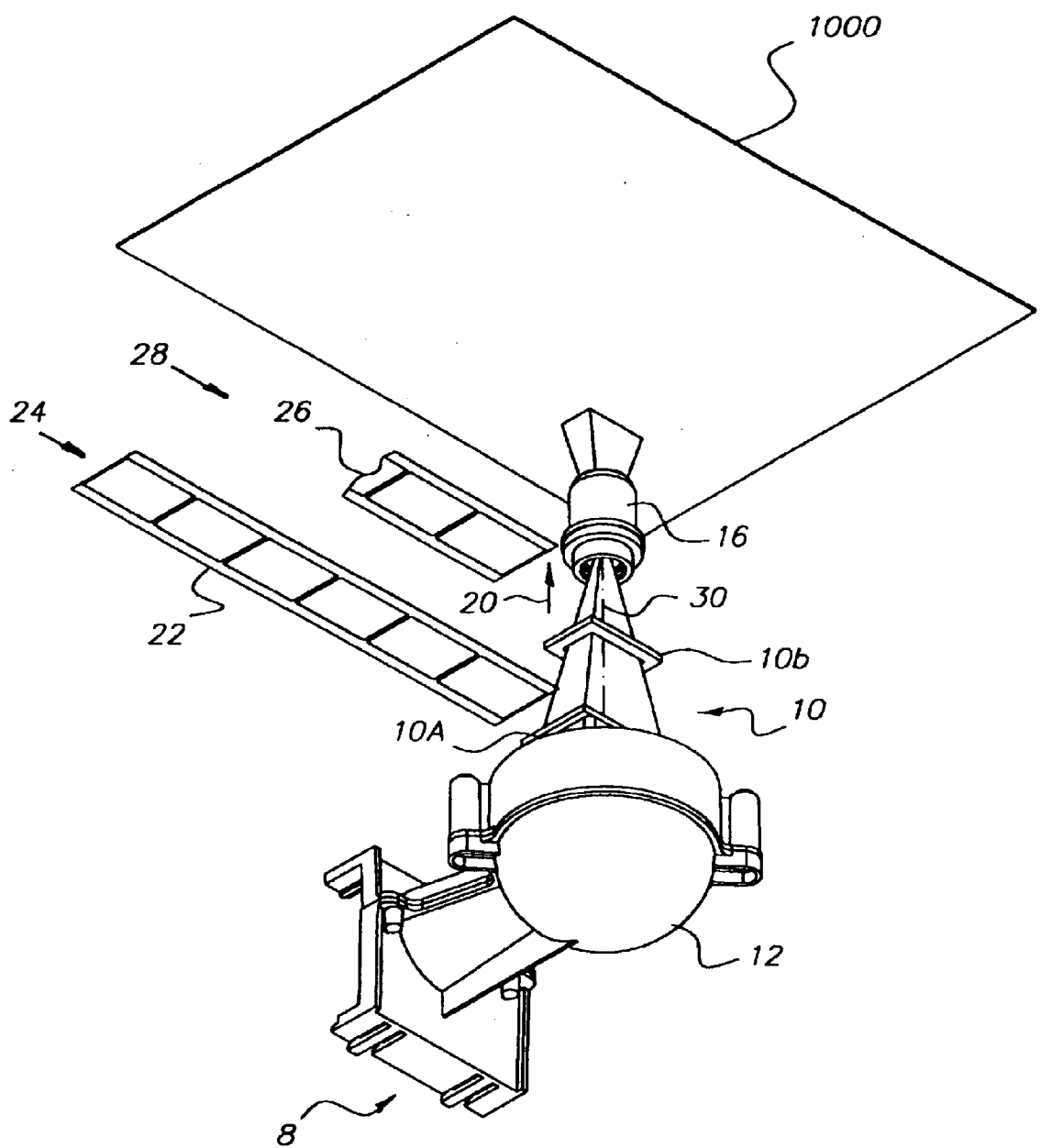
FIG. 1(b) illustrates a perspective view of the imaging device of FIG. 1(a) used as a printer for printing on paper.

As illustrated in FIGS. 1(a) and 1(b), imaging device 8 includes an illuminator 12 which directs a beam of light 14 along an optical axis 30 in a direction 20. Light beam 14 travels along optical axis 30 and passes through a first media gate 10a and a second media gate 10b located downstream of first media gate 10a with respect to direction 20 of light beam 14.

An imaging lens 16 is positioned downstream of second media gate 10b with respect to direction 20. Imaging lens 16 images light beam 14 onto a CCD 18 (FIG. 1(a)) for a subsequent digital printing of an image appearing on photosensitive media at either of media gates 10a, 10b (or images the beam on paper 1000 as shown in FIG. 1(b)).

With respect to media gate arrangement 10, first media gate 10a is of a first size. That is, first media gate 10a has a first aspect ratio and aperture size for imaging photosensitive media 22 of a first format which travels along a first media path schematically illustrated by arrow 24. Second media gate 10b is of a second size, and more specifically, second media gate 10b has a second aspect ratio and aperture size, for imaging photosensitive media 26 of a second format, which travels along a second media path schematically illustrated by arrow 28. It is noted that first and second media gates 10a, 10b are positioned along the same optical axis 30 and thus, a change of media gates is not required when, for example, scanning media of different formats. For example, if media of a first format, such as 35 mm film, is to be scanned at media gate 10a, illuminator 12 will direct light beam 14 along optical axis 30 through media gate 10a and media gate 10b, while imaging lens 16 and CCD 18 are positioned in accordance with the aperture size and aspect ratio of media gate 10a. Therefore, when scanning media 22 of a first format at media gate 10a, media 22 which is conveyed along path 24 is positioned at first media gate 10a, and light beam 14 passes through both media gates 10a, 10b in direction 20. Light beam 14 will thereafter be imaged by imaging lens 16 onto CCD 18. When it is desired to scan media 26 of a second format, such as APS film, media 26 is conveyed along path 28, and positioned at second media gate 10b. Light beam 14 will pass from illuminator 12 through first media gate 10a, and converge or cone down through the aperture of second media gate 10b. Light beam 14 will be imaged by lens 16 onto CCD 18. It is noted that CCD 18 and imaging lens 16 are positioned along optical axis 30 according to the type of media being scanned.

Thus, media gate arrangement 10 as illustrated in FIG. 1(a) defines a unique arrangement which can permit, for example, the scanning of at least two films of different formats, along the same optical axis without having to change over media gates. FIGS. 1(a) and 1(b) show gates 10a, 10b arranged in an over and under fashion. This is illustrated for descriptive purposes and the present invention is not limited to the over and under arrangement shown. It is recognized that gates 10a, 10b can be positioned in a side-by-side relationship in a manner in which the gates extend in a vertical plane and a horizontal optical axis would extend through the aperture of each gate.

Using 35 mm and APS film as an example, in the case of 35 mm film which would be conveyed along path 24 and across media gate 10a, light beam 14 will pass through the aperture of gate 10a as well as the aperture of gate 10b which could be, for example, an APS film gate. Thus, the scanning of 35 mm film would also involve light passing through media gate 10b which in the described example would be an APS film gate. In the case of scanning APS film, the APS film would be conveyed along path 28 and across gate 10b. The same light beam 14 which runs along optical axis 30 and passes through first format media gate 10a would pass through second format (i.e., APS) media gate 10b. In film gate arrangement 10 as illustrated in FIG. 1, first and second film formats such as 35 mm film and APS film can be accommodated in first and second paths (24, 28). With respect to the different media formats, for ease of understanding the present description makes reference to 35 mm and APS film. However, it is recognized that the present invention is not limited thereto. It is noted that the film or media format can encompass any type of media and/or film.

In scanning or printing media of different formats utilizing a media arrangement as described, the aspect size of the different media gates in relation to the light beam have to be considered. One approach involves adjusting the imaging optics to compensate for the different gates. As a further example and in accordance with the present invention, for scanning 35 mm and APS film at the media gates as illustrated in FIG. 1(a), due to a difference in aspect ratios between 35 mm film and APS formats, the length dimension of the 35 mm aperture which is represented in FIG. 1(a) by media gate 10a is increased. This length increase (from nominally 35 mm to 43–47 mm) helps to maintain a path of light beam 14 for the illumination of APS film at media gate 10b which would be obscured by a standard 35 mm aperture.

Figure 2A:
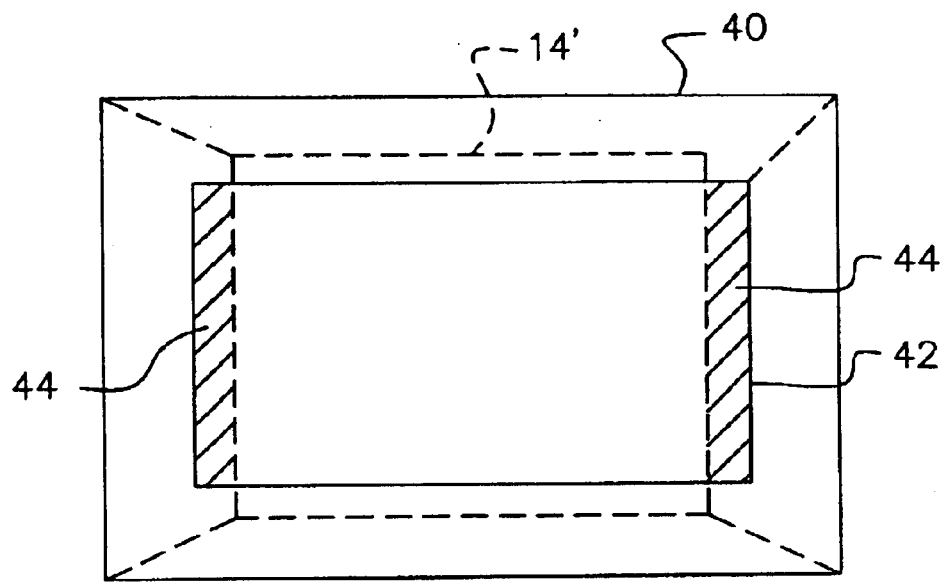
FIG. 2(a) is a top view of one example of a media gate arrangement.
Figure 2B:
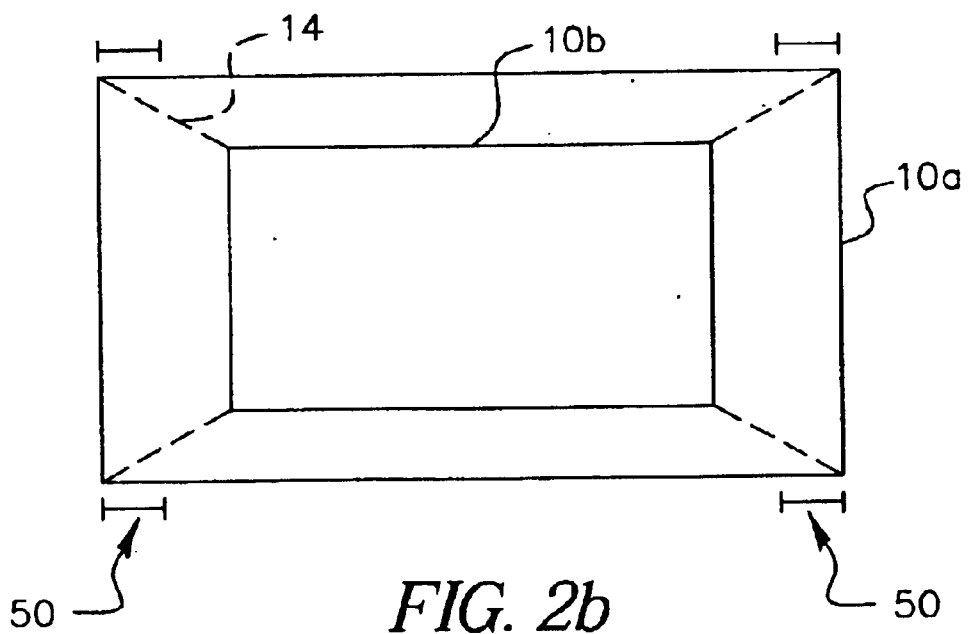
FIG. 2(b) is a top view of the media gate arrangement as illustrated in FIG. 1.

For example, reference is made to FIG. 2(a) which illustrates a top view of a standard length 35 mm film gate 40 and a standard length APS film gate 42. If standard APS gate 42 is placed adjacent to standard 35 mm gate 40 in the manner as illustrated in FIGS. 1(a) and 1(b) with respect to media gates 10a, 10b, then a path of light beam 14' would tend to arrive at APS gate 42 as shown in FIG. 2(a). More specifically, a cone down of light beam 14' would be as represented by the dash line in FIG. 2(a), and would be such that there would be edge loss areas 44 at each end of standard APS gate 42. Thus, in scanning APS film at standard APS gate 42, which would correspond to media gate 10b of FIG. 1(a), edge loss areas 44 would adversely affect the image. This is due to the fact that a full size APS aperture is recommended for scanning APS film. The length increase of the 35 mm gate from 35 mm to, for example, 45 mm is necessary to maintain the path of light beam 14' for the illumination of the APS film passing across APS gate 42. A standard 35 mm gate aperture 40 as illustrated by FIG. 2(a) would obscure light beam 14' to cause edge loss areas 44. In order to compensate for and eliminate edge loss areas 44, the length of 35 mm gate 40 as illustrated as FIG. 2(a) is extended so as to provide for an expanded 35 mm gate 10a as illustrated in FIG. 2(b) and FIG. 1(a). The increase in the length of the 35 mm gate 10a serves to converge or cone down the path of light beam 14 to an area covered by standard APS film gate 10b as illustrated by the dash line in FIG. 2(b). Therefore, the aperture of APS gate 10b will be fully illuminated.

Applicants have discovered that a desired film aperture for a 35 mm film gate is approximately 23 mm by 35 mm. Within the context of the present invention, the expanded 35 mm gate can have an approximate aperture size of 23 mm by 43–47 mm. Therefore, the length of expanded 35 mm film gate 10a is increased by approximately 8–12 mm and would include a 4–6 mm expansion 50 on each side as illustrated in FIG. 2(b). Applicants note that the described example refers to APS and 35 mm film. The invention is not in any way limited by the noted dimensions and types of film which are given for explanatory purposes. The present invention is applicable to other types of film formats and media, where the aperture size and the expanded area of the aperture size would be set according to the type of film, the type of imaging lens, etc. Thus, when using 35 mm and APS film as your film types in the media gate arrangement 10 as illustrated in FIG. 1(a), media gate 10a is used for 35 mm film and is expanded as illustrated in FIG. 2(b), while media gate 10b is a standard APS film gate and is positioned at optical axis 30 downstream of 35 mm film gate 10a with respect to direction 20. This specific configuration enables the path of light beam 14 to converge or cone down so as to completely illuminate the aperture for APS film gate 10b as illustrated in FIG. 1(a) and FIG. 2(b).

Continuing to utilize 35 mm film and APS film as examples, with an expanded 35 mm gate 10a as illustrated in the FIG. 1(a), adjustments are necessary when scanning 35 mm film. More specifically, the expanded areas 50 as illustrated in FIG. 2(b) must be addressed to avoid flare and sensor overexposure when scanning 35 mm film at film gate 10b. Otherwise, light would be able to pass around the area covered by the 35 mm film as it passes across film gate 10a to cause a significant flare problem.

Figure 3A:
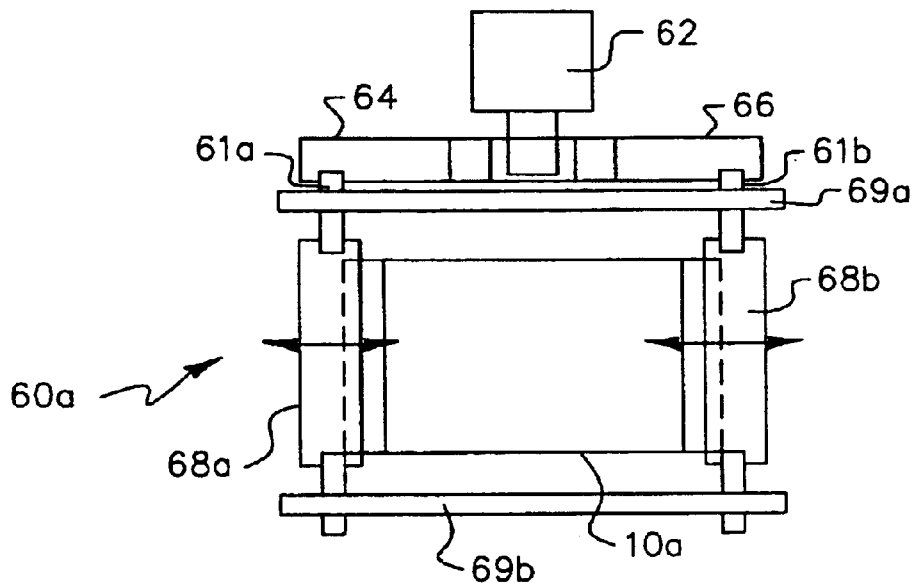
FIGS. 3(a)–3(c) are schematic illustrations of blocking mechanisms for at least one of the media gates illustrated in FIG. 1.
Figure 3B:
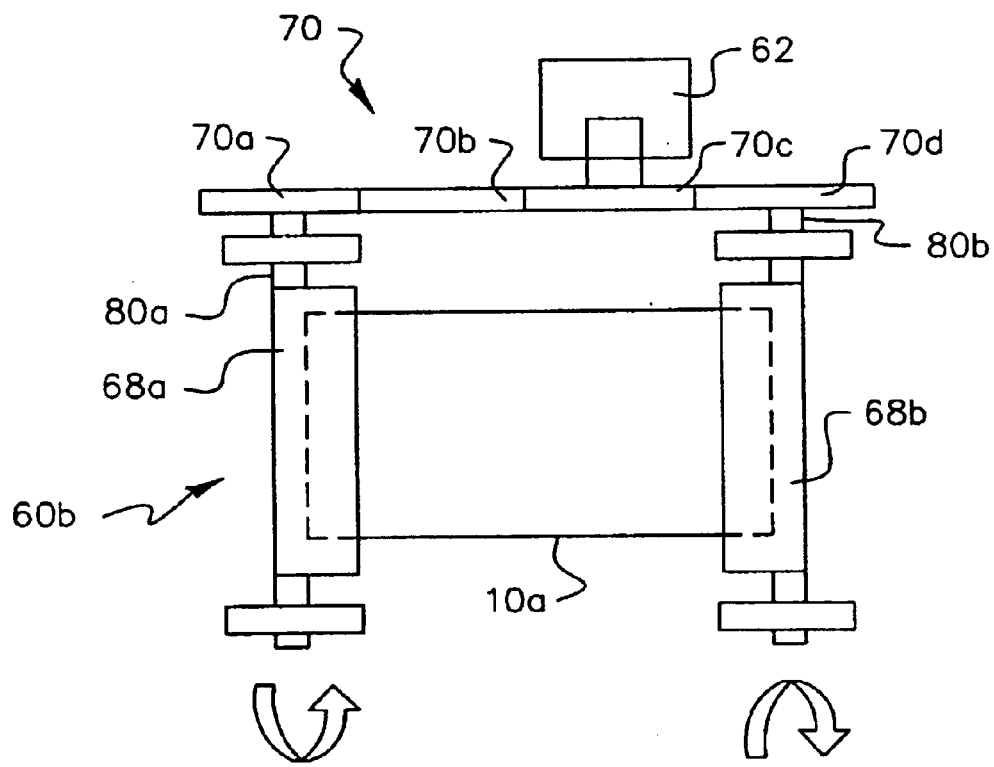
Figure 3C:
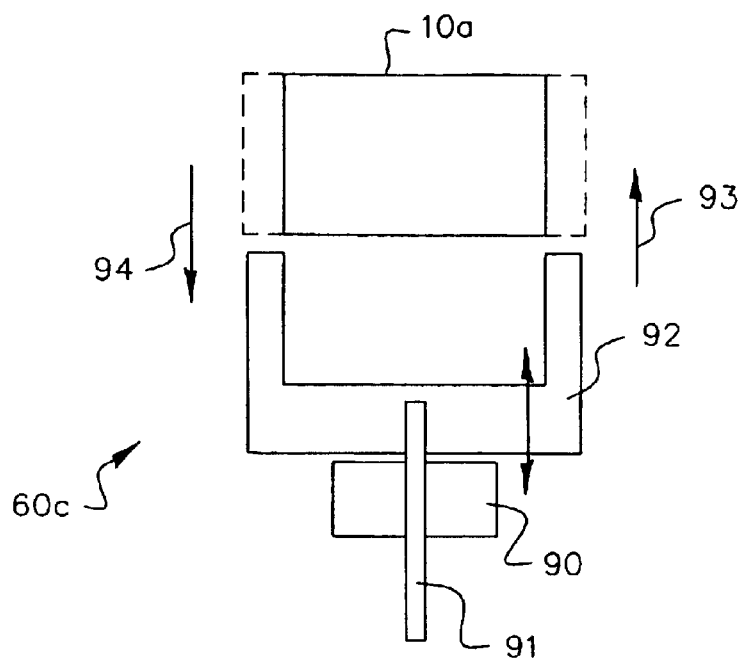

To address this, a further feature of the invention as illustrated in FIGS. 3(a)–3(c) relates to the utilization of a blocking mechanism such as a light blocking curtain. That is, when using an expanded media or film gate 10a as illustrated in FIG. 1(a), a light blocking curtain is recommended to avoid flare problems when scanning media at gate 10a. In the example of 35 mm film, the blocking curtains would essentially decrease or reduce the length of the expanded 35 mm gate 10a to a standard 35 mm gate. That is, as described with respect to FIGS. 2(a) and 2(b), due to the difference in aspect ratio between 35 mm and APS film formats, it is recommended that the length dimension of the 35 mm aperture be increased to maintain a light path for the illumination of the APS film gate. This increase can be from a nominal film length of 34.8 mm to approximately 45 mm. When scanning APS film, the full aperture is required, however, when scanning 35 mm film, the additional or expanded areas 50 (approximately 5 mm on each edge of the expanded 35 mm gate 10a) must be blocked to avoid flare and sensor overexposure. For example, if a reprint where made on a strip where one of the end negatives is being scanned, light would be able to pass around even the minimum density area in the border of the film (D min) causing flare.

FIGS. 3(a)–3(c) illustrate three embodiments for blocking mechanisms which can be utilized within the context of the present invention. More specifically, and with reference to FIG. 3(a), a first blocking mechanism 60a is illustrated. Blocking mechanism 60a comprises a motor 62 which drives upper and lower racks (64,66) attached to rail mounted baffles 68a, 68b. More specifically, as illustrated in FIG. 3(a), blocking mechanism 60a includes motor 62, left (upper or lower) rack 64 and right (upper or lower) rack 66. Mounted respectively on shafts 61a, 61b extending from left and right racks 64, 66, are baffles 68a, 68b. Shafts 61a, 61b are guided by guide rods 69a and 69b. Thus, during use of blocking mechanism 60a as illustrated in FIG. 3(a), motor 62 is activated to move left rack and right rack 64, 66, and thereby move baffles 68a and 68b in directions represented by the arrows in FIG. 3(a). When scanning 35 mm film, the baffles 68a, 68b are moved toward each other so as to cover the opposing edge expanded areas 50 as illustrated in the FIG. 2(b). Thus, the expanded 35 mm gate 10a as illustrated in FIG. 1(a) is reduced to a standard 35 mm film gate. When it is desired to scan APS film at media gate 10b, motor 62 is reversed to move baffles 68a, 68b away from each other to form an expanded aperture for media gate 10a as illustrated in FIG. 1(a). Thus, with the expanded media gate 10a it is possible to fully illuminate the aperture for media gate 10b for scanning APS film.

FIG. 3(b) illustrates a second embodiment of a blocking mechanism in accordance with the present invention. Blocking mechanism 60b as illustrated in FIG. 3(b) includes motor 62 which drives a gear train 70 that includes gears 70a, 70b, 70c and 70d. One of the gears (70a) on gear train 70 is keyed to a shaft 80a onto which it is mounted baffle 68a. Baffle 68a rotates about an axis defined by shaft 80a in accordance with the rotation of gear 70a. A second gear (70d) in gear train 70 is keyed to a shaft 80b onto which is mounted baffle 68b. Baffle 68b is rotatable about an axis which extends along shaft 80b. Therefore, in the embodiment of FIG. 3(b), actuation of motor 62 will cause rotation of gears (70a14 70d) within gear train 70. Rotation of gears (70a–70d) within gear train 70 will cause simultaneous opposite rotations of baffle 68a about the axis of shaft 80a and baffle 68b about the axis of shaft 80b. Therefore, when it is desired to reduce the length of expanded 35 mm gate 10a, the motor is rotated in one direction so as to rotate baffles 68a, 68b toward each other and block expanded areas 50 as shown in FIG. 3(b). In this position, 35 mm film can be scanned at gate 10a which now has its' opposite ends blocked. When it is desired to scan APS film at gate 10b, motor 62 is rotated in an opposite direction to cause baffles 68a, 68b to rotate away from each other about their respective axes and open up the aperture of gate 10a. This provides for the expanded aperture for gate 10a.

FIG. 3(c) illustrates a further example of a blocking mechanism in accordance with the present invention. As shown in FIG. 3(c), a blocking mechanism 60c can be in the form of a linear plane actuator having a U-shape baffle. More specifically, blocking mechanism 60c includes an arrangement which comprises a motor 90 and a lead screw 91. A U-shaped baffle 92 is mounted on lead screw 91. Therefore, a rotation of motor 90 in one direction will cause a rotation of lead screw 91, and a simultaneous linear movement of U-shape baffle 92 in a first direction 93 to block opposing extended areas 50 of the expanded 35 mm film gate 10a. In this blocking position 35 mm film can be scanned at gate 10a. The rotation of motor 90 in an opposite direction will cause an opposite rotation of lead screw 92 and a simultaneous linear movement of baffle 92 in direction 94 to open up the opposing extended areas 50 of 35 mm film gate 10a. In this opened position APS film can be scanned at gate 10b.

It is preferred but not required that blocking mechanism 60a, 60b or 60c be located in close proximity to the film path along the optical axis. Also, the present invention is not limited to the arrangements of the blocking mechanisms as shown. Other blocking mechanism arrangements are possible within the context of the present invention. For example, one can use a motor and pulley combination to move the baffles, or one can use a manually operated lever or handle to move the baffles.

Figure 4A:
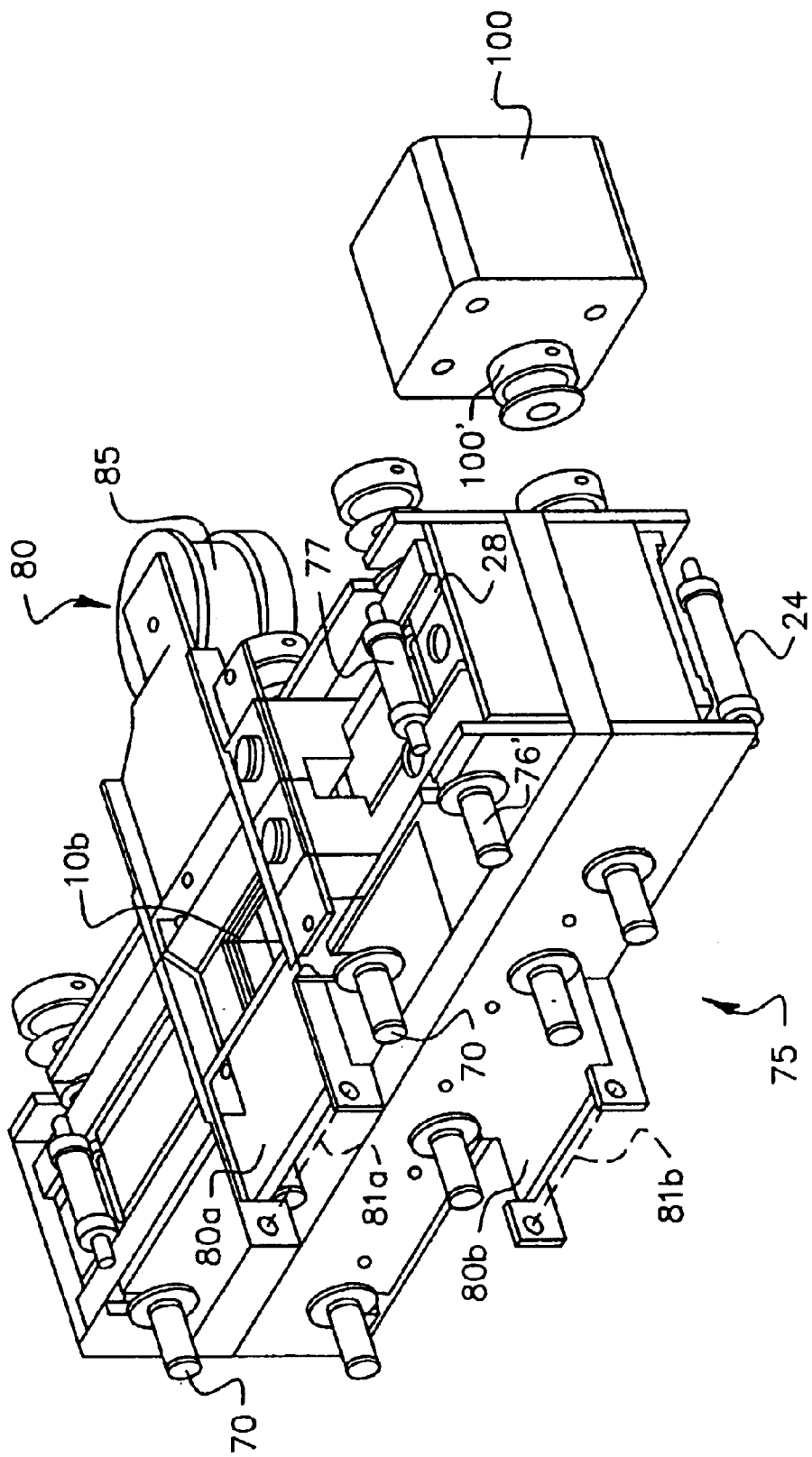
FIG. 4(a) is a perspective view of an imaging assembly including the media gate arrangement in FIG. 1, and illustrating a clamping mechanism and a transporting mechanism for media.

In a further feature of the invention, the imaging device of the present invention includes a media transporting assembly which conveys media along the paths 24, 28 for respectively transporting media across media gates 10a, 10b. As illustrated in FIG. 4(a), a transporting assembly 75 includes path 28 which leads media to media gate 10b, and path 24 which leads media to media gate 10a. In the perspective view of FIG. 4(a), media gate 10a is not seen, but would be below media gate 10b and have the configuration illustrated in FIGS. 1(a) or 1(b). Transporting assembly 75 further includes a series of drive roller assemblies 76' and a series of idler rollers 77. Drive roller assemblies 76' each include a roller 76 (see FIGS. 6(a)–6(c)) located directly opposite idler roller 77 which will be described later.

Figure 5:
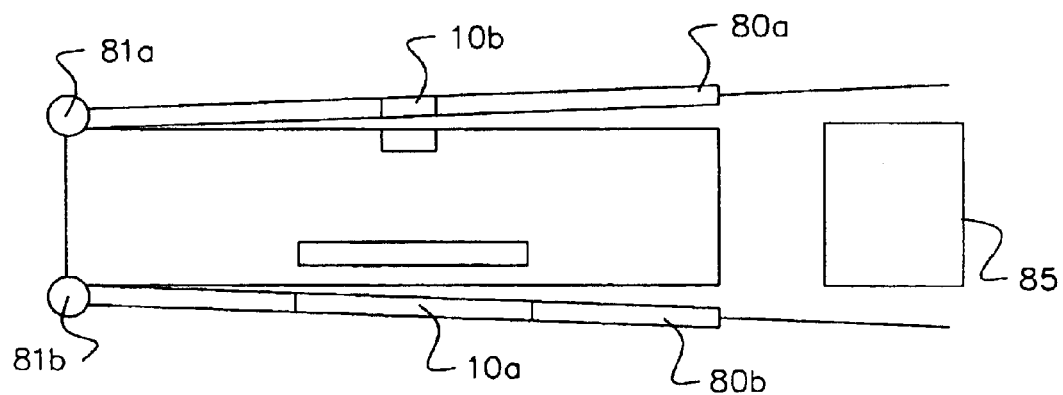
FIG. 5 is a side view illustrating the clamping mechanism and a transporting mechanism for the imaging device of FIG. 1.

FIG. 4(a) also illustrates a clamping mechanism 80 which is effective to clamp media at media gates 10b or 10a. Clamping mechanism 80 includes clamping bars or levers 80a, 80b which are each hinged at respective points or axes 81a, 81b so as to be pivoted, moved or rotated into a clamping position at media gates 10a, 10b. It is noted that axis 81 a is substantially parallel to axis 81b. More specifically, clamping lever 80a is hinged about axis 81a so as to be rotatable or pivotable to a clamping position to clamp media such as APS film at media gate 10b; and clamping lever 80b is hinged about axis 81b so as to be pivoted or rotated to a clamping position for clamping 35 mm film at media gate 10a (see FIG. 5). Clamping mechanism 80 further includes a double-sided solenoid 85 as illustrated in FIGS. 4(a) and 5 which is effective to urge either of clamping levers 80a, 80b to a clamping position. More specifically, when double-sided solenoid 85 is actuated, clamping levers 80a and 80b are moved to a clamping position at media gates 10a, 10b. Therefore, when either film (i.e. 35 mm, APS) is being transported the film could be clamped at the appropriate gate 10a, 10b. In this embodiment, it is possible to move levers 80a, 80b simultaneously, since the presence of a lever at a gate where film is not present will not adversely effect operation.

Figure 4B:
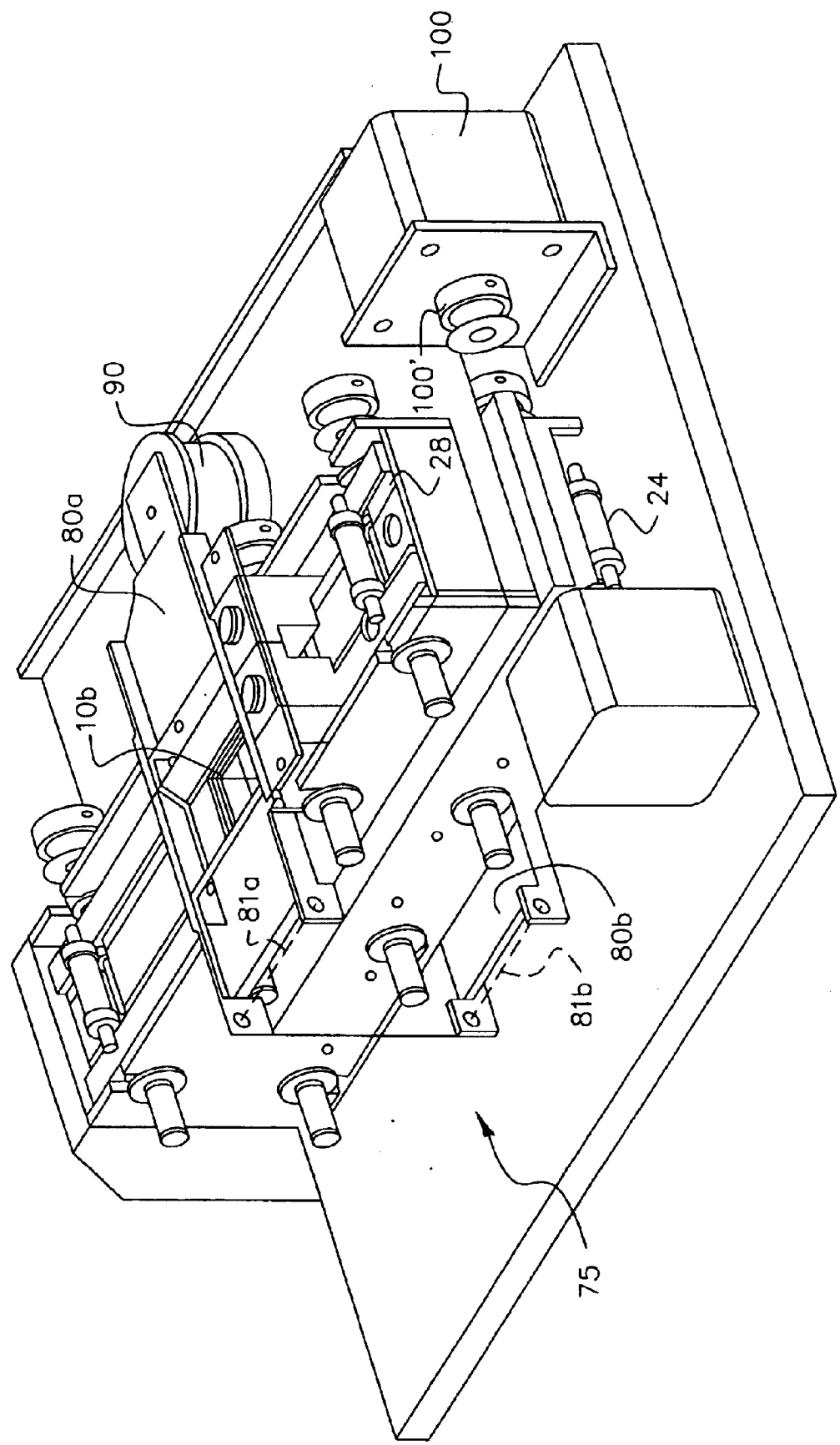
FIG. 4(b) is a further example of a clamping mechanism and a transporting mechanism for the imaging device as illustrated in FIG. 1.

Of course, the present invention is not limited to utilizing a double-sided solenoid. That is, the present invention can use one solenoid dedicated to clamping lever 80a and another solenoid dedicated to clamping lever 80b as shown in FIG. 4(b). For clarity purposes, FIG. 4(b) only shows a solenoid 90 for clamping lever 80a. It is recognized that the embodiment of FIG. 4(b) would include a second solenoid below the solenoid 90 which is dedicated to clamping lever 80b.

Figure 6A:
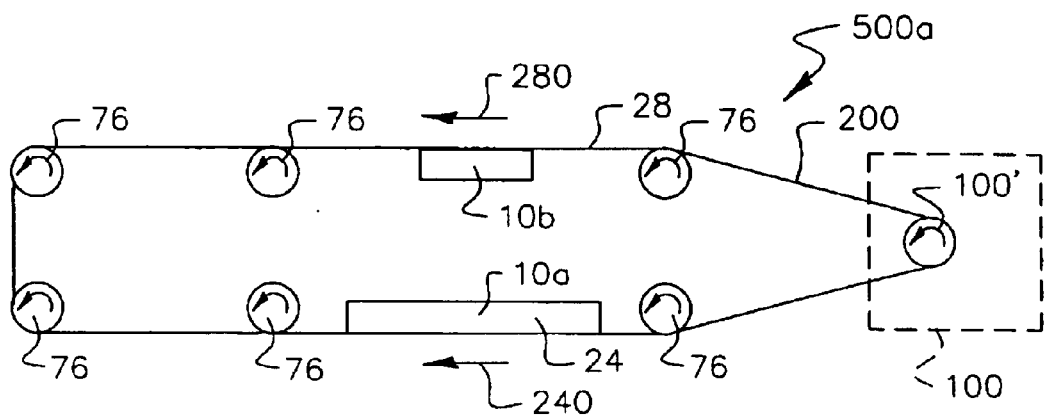
FIGS. 6(a)–6(c) are examples of a belt drive system for the transporting mechanism of FIG. 4(a) or FIG. 4(b)
Figure 6B:
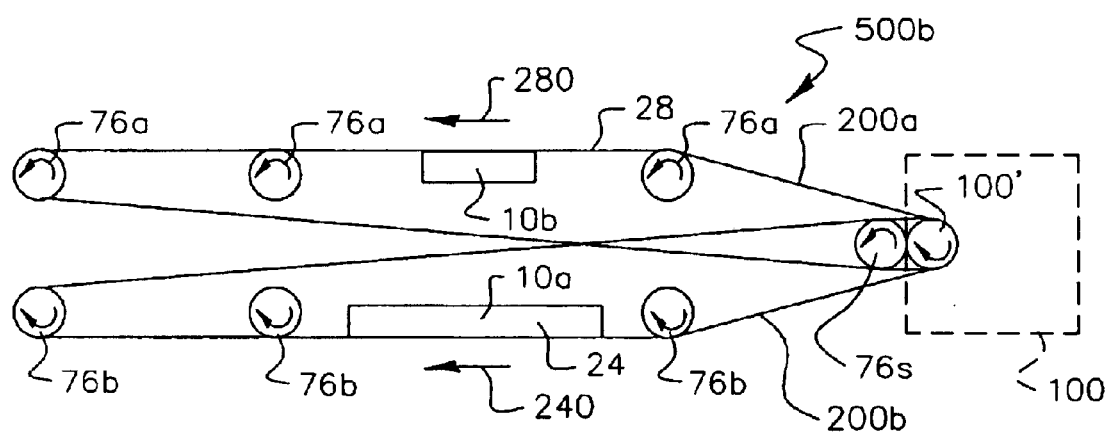
Figure 6C:
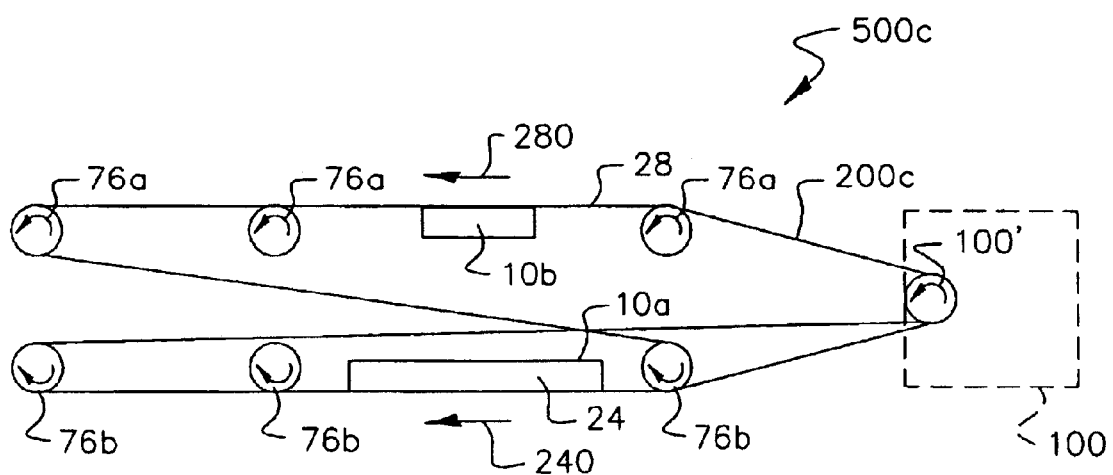

A drive mechanism for driving drive rollers 76 of drive roller assemblies 76' will now be described with reference to FIGS. 6(a)–6(c). Each of FIGS. 6(a)–6(c) illustrate only the center section of transport assembly 75. Essentially, idler rollers 77 would be spring mounted idler rollers positioned opposite drive rollers 76 so as to form a nip through which media such as to film would be driven.

FIGS. 6(a)–6(c) illustrate belt drive systems for the imaging device of the present invention. As explained above, each of the views of FIGS. 6(a)–6(c) refer to a center section of transport assembly 75 as illustrated in FIG. 4(a), and for purposes of simplicity, only show drive rollers for driving a conveyor belt. It is noted that the imaging device including transport assembly 75 would include a cover as illustrated in FIG. 4(a) that would comprise idler rollers 77 as illustrated in FIG. 4(a). When the cover is closed, rollers 76 and 77 form a nip through which film and/or media would be driven.

FIG. 6(a) illustrates a first embodiment of a belt drive system 500a for transport assembly 75. As illustrated in FIG. 6(a), belt drive system 500a includes a motor 100 drivingly associated with a roller or pulley 100', drive rollers 76, and conveyer belt 200 in the form of a single endless belt. Belt 200 is wrapped around outer surfaces of roller 100' and rollers 76 which face idler rollers 77 when the covers containing idler rollers 77 are closed to form nips with rollers 76. With the system of FIG. 6(a), a counter-clockwise rotation of motor 100 and roller 100', as illustrated by the arrow in FIG. 6(a) would cause a corresponding counter clockwise rotation of all the drive rollers 76 as further illustrated by the arrows in FIG. 6(a), and a counter-clockwise rotation of belt 200. Therefore, with the routing of conveyer belt 200 as illustrated in FIG. 6(a), media traveling along media path 28 would travel in a direction shown by arrow 280.

When it is desired to convey media along path 24, the rotation of motor 100 and roller 100' is reversed to cause a clockwise rotation of each of drive rollers 76 and belt 200. A clockwise rotation of drive rollers 76 and belt 200 would permit a conveyance of media along path 24 in a direction as shown by arrow 240 which would be the same as direction 280. Therefore, in the embodiment of FIG. 6(a) a single reversible motor is effective to convey media along both paths.

FIG. 6(b) illustrates a second embodiment of a belt drive system 500b for transport assembly 75 of the present invention. In the embodiment of FIG. 6(b) motor 100 drives a shaft onto which roller 100' is keyed. This shaft also includes a gear which is in meshing relationship with a second gear provided on a shaft on which roller 76s is mounted. Therefore, a rotation of motor 100 will cause a rotation of roller 100' in a first direction and a rotation of roller 76s by way of the meshing gears in an opposite direction. Drive roller 76s along with drive rollers 76a drive a first belt 200a which is wrapped around roller 76s and rollers 76a. Motor 100 along with further drive rollers 76b also drive a further drive belt 200b that is wrapped around drive rollers 76b. Therefore, in the embodiment of FIG. 6(b), rotation of motor 100 and roller 100', in for example, a clockwise direction as illustrated by the arrow in FIG. 6(b) will cause a counter clockwise rotation of drive roller 76s. This causes a corresponding counter clockwise rotation of drive rollers 76a which accordingly causes a counter-clockwise rotation of drive belt 200a. The same clockwise rotation of motor 100 will cause corresponding clockwise rotations of drive rollers 76b and thus, a clockwise rotation of drive belt 200b. With the arrangement of FIG. 6(b), motor 100 only has to be rotated in one direction to respectively convey film or media via paths 28 and path 24 in directions 280 and 240 as shown in FIG. 6(b).

In the embodiment of FIG. 6(c), a belt drive system 500c defines a cross belt arrangement. As illustrated in FIG. 6(c), motor 100 which drives roller 100' in combination with drive rollers 76a and drive belt 200c are utilized to convey film or media along path 28 in direction 280. The combination of motor 100, roller 100' and drive rollers 76b are utilized to drive film or media along media path 24 in direction 240. With the arrangement of FIG. 6(c), a counter clockwise rotation of motor 100 and roller 100' will cause corresponding counter-clockwise rotations of drive rollers 76a and thus permit belt 200c to drive media along media path 28 in direction 280 indicated by the arrow. Due to the crossbelt configuration of belt 200c, the counter-clockwise rotation of motor 100 and roller 100' causes rollers 76b to rotate in a clockwise direction. This permits media to be conveyed along path 24 in direction 240 as indicated by the arrow. Therefore, the crossbelt arrangement of FIG. 6(c) provides for a single motor direction for moving media along both paths 28 and 24 in the same direction.

The present invention thus provides for a unique imaging device having a media or film gate arrangement. The imaging device of the present invention includes a transport assembly having clamping mechanisms which enable the clamping of media or film of different formats at each of the gates, as well as a unique drive system for efficiently conveying the media alone each of the media paths and across the gate arrangement.

During use of the imaging device of the present invention, media or film is transported along a path upstream of paths 24 and 28 with respect to a conveying direction of media. At a location upstream of the imaging device and preferably along the path upstream of paths 24 and 28, a sensor such as an optical sensor or another type of sensor detects what type of media or film is being conveyed. If, for example, the sensor determines that APS film is being conveyed, the APS film would be directed to path 28 by way of, for example, a direction changer in the upstream path. The APS film would then be clamped at APS gate 10b by use of clamping lever 80a as illustrated in FIG. 3. An image from the APS film can then be imaged onto a CCD or paper as previously described. If the sensor determines that the film is, for example, 35 mm film, the film would be directed to path 24 and clamped at film gate 10*a* by clamping lever 80*b*, where it is imaged onto the CCD or paper. Illuminator 12 provides for a light beam which goes through gates 10*a* and 10*b* and runs along the same optical axis 30. Each of the media gates 10*a*, 10*b* is positioned along the same optical path, and therefore, it is not necessary to change the media gate to correspond to the type of film being imaged or scanned.

Although the present invention illustrates first and second media gates 10(*a*), 10(*b*), the present invention is not limited thereto. Within the context of the present invention, additional media gates (i.e. more than two) can be provided along the optical axis for imaging a plurality of photosensitive media, such as 120 mm, 46 mm, 35 mm, APS and 110 film. When adding additional media gates, the position of the imaging lens as well as the CCD or paper onto which the light is imaged would be adjusted along the optical axis. As an example, a scanner which has multiple gates can include a variable magnification camera. The scanner further includes an optical path that positions various films formats at different planes with the camera viewing the film an/or the illumination system backlighting the film through the apertures of the unused formats. With this arrangement, one should position the largest format nearest the illumination system and the smallest formats nearest the camera. Beyond this, the distances between film apertures (or gates), and the position of the camera relative to the apertures should be constrained such that no vignetting occurs from the unused apertures. Simultaneously, the proper conjugate distances should be maintained for proper focus and magnification of the various formats. Furthermore, this is complicated by film formats of different aspect ratios.

Figure 7A:
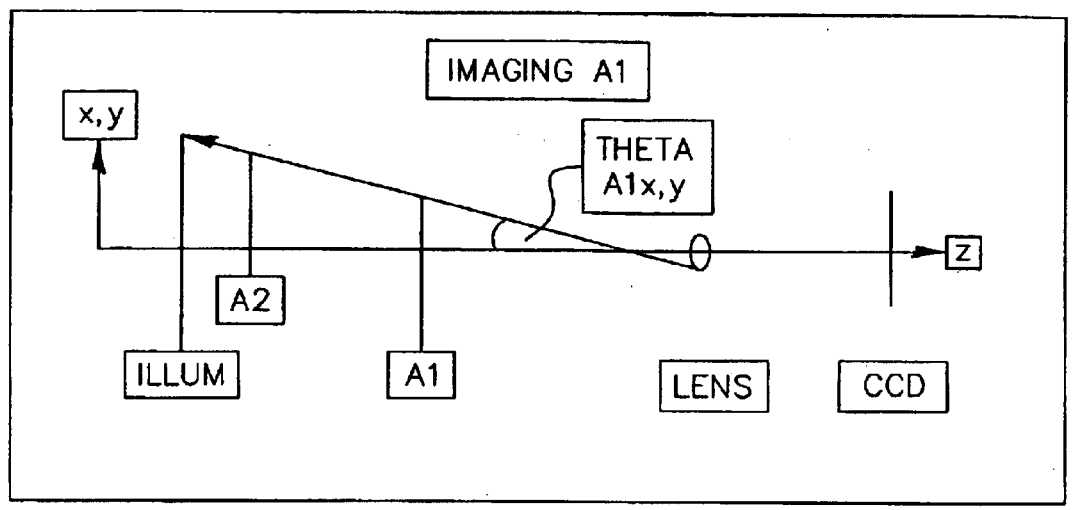
FIGS. 7(a)–7(b) schematically illustrate light ray examples for multi-format scanners.
Figure 7B:
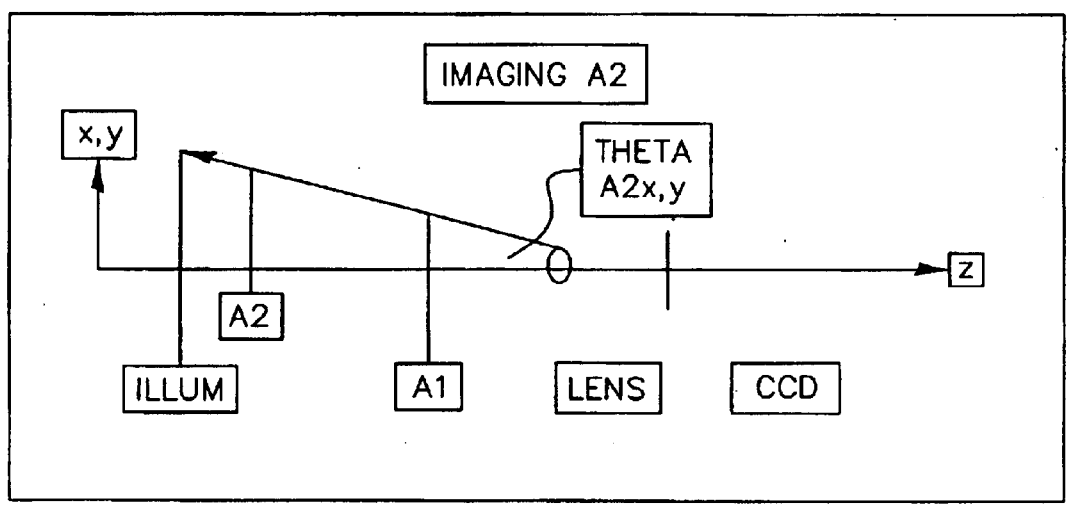

As an example and with reference to FIGS. 7(*a*) and 7(*b*), beginning at the smallest format aperture A1 (nearest the camera), two orthogonal, extreme rays are traced. The first ray begins at the extreme edge of the entrance pupil of the lens and passes through the optical axis, the edge of the film, and then must continue unobstructed to the illuminator through the other unused apertures (FIG. 7(*a*)). Theta A1x or theta A1y may set the worst case vignetting constraint depending on the size and aspect ratio of the two apertures A1 and A2. For APS and 35 mm film the vignetting in this case is set by theta A1y. Furthermore, the A2 y-dimension of the aperture (35 mm) must be extended beyond the standard 35 mm frame dimensions to meet this requirement.

For imaging film at A2 with A1 open, the two extreme, orthogonal rays now begin at the edge of the entrance pupil of the lens, but do not pass through the optical axis (FIG. 7(*b*)). To meet the no vignetting criteria, the rays must pass through A1 unobstructed. For APS and 35 mm film, theta A2x sets the vignetting constraints.

Beyond the dual aperture approach, the addition of more film formats would require consideration of vignetting constraints for rays across the full aperture of the lens for the apertures placed between A1 and A2.

The invention has been described in detail with particular reference to certain preferred embodiments thereof, but it will be understood that variations and modifications can be effected within the spirit and scope of the invention.

What is claimed is:

1. An imaging device adapted to image photosensitive media of different formats, the imaging device comprising:
    a first media gate for a first photosensitive media of a first format, said first media gate being located at an optical axis and having a first aperture through which a light beam can pass;
    a second media gate for a second photosensitive media of a second format, said second media gate being located at said optical axis and having a second aperture through which the light beam can pass; and
    a first media path for said first photosensitive media, and a second media path for said second photosensitive media, said first media path guiding said first photosensitive media across said first media gate, and said second media path guiding said second photosensitive media across said second media gate.

2. An imaging device according to claim 1, wherein said first and second media gates are film gates.

3. An imaging device according to claim 2, wherein one of said first photosensitive media and said second photosensitive media is 35 mm film, such that one of said first and second media gates is a 35 mm film gate, and the other of said first photosensitive media and said second photosensitive media is APS film, such that the other of said first and second media gates is an APS film gate.

4. An imaging device according to claim 1, further comprising an illumination source for the light beam which directs the light beam through said first and second media gates along said optical axis and to an imaging lens.

5. An imaging device according to claim 4, wherein said imaging lens images said light beam onto a CCD array.

6. An imaging device according to claim 4, wherein said imaging lens images said light beam onto a receiving media.

7. An imaging device according to claim 3, wherein said 35 mm film gate is located upstream of said APS film gate with respect to a direction of the light beam along the optical axis.

8. An imaging device according to claim 1, further comprising a media transportation assembly for transporting the media along the first and second media paths and respectively across said first and second media gates.

9. An imaging device according to claim 8, wherein said media transportation assembly comprises:
    a first set of rollers for conveying the media of a first format along the first media path, said first set of rollers conveying the media of a first format to the first media gate; and
    a second set of rollers for conveying the media of a second format along the second media path, said second set of rollers conveying the media of a second format to the second media gate.

10. An imaging device according to claim 9, wherein said media transportation assembly further comprises:
    an endless belt wrapped around said first and second set of rollers; and
    a motor for rotating said belt to cause a rotation of each of said first and second set of rollers;
    wherein:
        a rotation of said motor in a first rotational direction rotates said belt and said first set of rollers in the first rotational direction, such that said media of a first format is conveyed in a linear direction along said first media path and across said first media gate; and
        a rotation of said motor in a second rotational direction opposite to said first rotational direction rotates the belt and the second set of rollers in the second rotational direction, such that said media of a second format is conveyed in said linear direction along said second media path and across said second media gate.

11. An imaging device according to claim 9, wherein said media transportation assembly further comprises:
    a first endless belt wrapped around said first set of rollers and a further roller, said first endless belt extending along said first media path;
    a second endless belt wrapped around said second set of rollers and extending along said second media path; and a motor for driving said first and second endless belts;
wherein:
    a rotation of said motor in a first rotational direction rotates said further roller and said first set of rollers in a second rotational direction which is opposite to said first rotational direction, such that said media of a first format is conveyed in a linear direction along said first media path and across said first media gate; and said rotation of said motor in said first rotational direction rotates said second belt and said second set of rollers in said first rotational direction, such that said media of a second format is conveyed in said linear direction along said second media path and across said second media gate.

12. An imaging device according to claim 9, further comprising:
a single endless belt configured in a crossed arrangement so as to define a first belt section and a second belt section, said first belt section of said endless belt being wrapped around said first set of rollers and said second belt section of said endless belt being wrapped around said second set of rollers; and
a motor for rotating said belt to cause a rotation of each of said first and second set of rollers;
wherein:
    a rotation of said motor in a first rotational direction rotates said first belt section of said endless belt and said first set of rollers in the first rotational direction, such that said media of a first format is conveyed in a linear direction along said first media path and across said first media gate; and said rotation of said motor in said first rotational direction rotates the second belt section of said endless belt and the second set of rollers in a second rotational direction opposite to the first rotational direction, such that said media of a second format is conveyed in said linear direction along said second media path and across said second media gate.

13. An imaging device according to claim 1, wherein:
said first photosensitive media is film of a first format and said second photosensitive media is film of a second format; and
said imaging device is a film scanner which scans said film of a first format at said first media gate and said film of a second format and said second media gate.

14. An imaging device according to claim 1, wherein said imaging device is a printer.

15. An imaging device adapted to image photosensitive media of different formats, the imaging device comprising:
a first media gate for a first photosensitive media of a first format, said first media gate being located at an optical axis and having a first aperture through which a light beam can pass; and
a second media gate for a second photosensitive media of a second format, said second media gate being located at said optical axis and having a second aperture through which the light beam can pass;
wherein:
    said first and second media gates are film gates;
    one of said first photosensitive media and said second photosensitive media is 35 mm film, such that one of said first and second media gates is a 35 mm film gate, and the other of said first photosensitive media and second photosensitive media is APS film, such that the other of said first and second media gates is an APS film gate;

said 35 mm film gate is located upstream of said APS film gate with respect to a direction of the light beam along the optical axis; and
    a length of said 35 mm gate, and a length of an aperture of said 35 mm film gate are extended to maintain a path of the light beam from said 35 mm film gate to said APS film gate substantially within an aperture of said APS film gate.

16. An imaging device according to claim 15, further comprising a blocking mechanism to block opposing edges of the extended length 35 mm film gate aperture when 35 mm is being conveyed across said 35 mm film gate.

17. An imaging device according to claim 16, wherein said blocking mechanism when actuated reduces a size of said extended length 35 mm aperture to a standard size 35 mm aperture.

18. An imaging device according to claim 16, wherein said blocking mechanism comprises a substantially U-shaped baffle which is movable over the 35 mm film gate to block the opposing edges of the extended length 35 mm film gate aperture.

19. An imaging device according to claim 16, wherein said blocking mechanism comprises first and second baffles movable along a direction of movement of the 35 mm film, and a motor and rack arrangement operationally associated with said first and second baffles to move said first and second baffles along said direction of movement to position said baffles over the opposing edges of the extended length 35 mm gate aperture.

20. An imaging device according to claim 16, wherein said blocking mechanism comprises first and second baffles located at opposing ends of said extended length 35 mm film gate, said first and second baffles being rotatable between a first position in which said extended length 35 mm aperture is completely opened and a second position in which the opposing edges of said extended length 35 mm aperture is blocked.

21. An imaging device adapted to image photosensitive media of different formats, the imaging device comprising:
a first media gate for a first photosensitive media of a first format, said first media gate being located at an optical axis and have a first aperture through which a light beam can pass;
a second media gate for a second photosensitive media of a second format, said second media gate being located at said optical axis and have a second aperture through which the light beam can pass; and
a first clamping mechanism for clamping said first photosensitive media at said first media gate, and a second clamping mechanism for clamping said second-photosensitive media at said second media gate.

22. An imaging device according to claim 21, wherein said first clamping mechanism is hinged at a first axis, and said second clamping mechanism is hinged at a second axis which is substantially parallel to said first axis.

23. An imaging device according to claim 22, further comprising a solenoid arrangement adapted to hold each of said first and second clamping mechanism in a clamping position to respectively clamp said first photosensitive media at said first media gate and said second photosensitive media at said second media gate.

24. An imaging device according to claim 22, further comprising a double-sided solenoid, said double-sided solenoid pivoting said first clamping mechanism in a first direction about said first axis to a first media gate clamping position, to clamp a section of said first photosensitive media at said first media gate, and pivoting said second clamping mechanism in a second direction about said second axis to a second media gate clamping position, to clamp a section of said second photosensitive media at said second media gate.

25. A method of imaging photosensitive media of different formats, the method comprising the steps of:
- positioning a first media gate at an optical axis;
- positioning a second media gate at said optical axis and downstream of said first media gate with respect to a direction of a beam of light along the optical axis; and
- conveying a first photosensitive media of a first format along a first media path and across said first media gate, and a second photosensitive media of a second format along a second media path and across said second media gate.

26. A method according to claim 25, wherein an illuminator is positioned upstream of said first media gate with respect to the direction of the beam of light, said illuminator directing the beam of light along the optical axis and through a first aperture of the first media gate and a second aperture of the second media gate.

27. A method according to claim 25, wherein an imaging lens is positioned downstream of the second media gate with respect to the direction of the beam of light.

28. A method according to claim 27, wherein said imaging lens images the light beam onto a CCD array.

29. A method according to claim 27, wherein said imaging lens images the light beam onto a receiving media.

30. A method according to claim 25, wherein said first photosensitive media is 35 mm film and said first media gate is a 35 mm film gate, and said second photosensitive media is APS film and said second media gate is an APS film gate.

31. A method according to claim 25, wherein said first photosensitive media is film of a first format, and said second photosensitive media is film of a second format.

32. A method of imaging photosensitive media of different formats, the method comprising the steps of:
- positioning a first media gate at an optical axis;
- positioning a second media gate at said optical axis and downstream of said first media gate with respect to a direction of a beam of light along the optical axis; and
- conveying a first photosensitive media of a first format across said first media gate, and a second photosensitive media of a second format across said second media gate;

wherein:
- said first photosensitive media is 35 mm film and said first media gate is a 35 mm film gate, and said second photosensitive film is APS film and said second media gate is an APS film gate; and
- a length of an aperture of said 35 mm film gate is extended beyond a standard size for 35 mm film, to maintain a path of the beam of light between the 35 mm film gate and the APS film gate substantially within an aperture of the APS film gate when the light beam reaches the APS film gate.

33. A method according to claim 32, comprising the further steps of:
- blocking opposing edges of the extended length 35 mm film gate aperture when 35 mm film is being conveyed across the 35 mm film gate, so as to reduce the length of the extended length 35 mm film gate aperture to a standard size 35 mm film gate aperture; and
- unblocking the blocked opposing edges of the extended length 35 mm film gate aperture when APS film is being conveyed across the APS film gate, so as to convert the standard size 35 mm film gate aperture back to the extended length 35 mm film gate aperture.

34. A scanner for scanning photosensitive film of different formats, the scanner comprising:
- an illumination source for directing a beam of light along an optical axis;
- a first film gate for film of a first format, said first film gate having a first aperture of a first size and being located at said optical axis; and
- a second film gate for film of a second format, said second film gate having a second aperture of a second size which is smaller than said first size, said second film gate being located at said optical axis downstream of said first film gate with respect to a direction of said light beam;
- wherein a length of said first aperture permits a path of the light beam between said first film gate and said second film gate to converge in as it approaches the second film gate, such that the light beam is substantially within the second aperture of the second film gate when the light beam reaches the second film gate.

35. A scanner according to claim 34, further comprising:
- an imaging lens located downstream of said second film gate with respect to said direction of said light beam for imaging the light beam onto a CCD array.

36. A scanner according to claim 34, wherein said film of a first format is 35 mm film and said film of a second format is APS film.

37. An imaging device comprising:
- a plurality of media gates, each of said media gates being adapted to image media of a different format, and each of said media gates being located at different media paths and along a single optical axis, such that a light beam can pass along the optical axis through the media gates.

* * * * *